(12) United States Patent
Kalynchuk et al.

(10) Patent No.: US 10,800,591 B1
(45) Date of Patent: Oct. 13, 2020

(54) BEVERAGE PREPARATION COMPOSITION AND PACKAGE

(71) Applicant: Thister Inc., Austin, TX (US)

(72) Inventors: Hunter B. D. Kalynchuk, Calgary (CA); Bryce V. Kalynchuk, Calgary (CA)

(73) Assignee: Thister Inc., Austin, TX (US)

( * ) Notice: Subject to any disclaimer, the term of this patent is extended or adjusted under 35 U.S.C. 154(b) by 0 days.

(21) Appl. No.: 16/725,614

(22) Filed: Dec. 23, 2019

(51) Int. Cl.
| | |
|---|---|
| *B65D 81/34* | (2006.01) |
| *A23F 3/18* | (2006.01) |
| *A23F 5/26* | (2006.01) |
| *A23L 2/56* | (2006.01) |

(Continued)

(52) U.S. Cl.
CPC ............ *B65D 81/3461* (2013.01); *A23F 3/18* (2013.01); *A23F 5/262* (2013.01); *A23L 2/56* (2013.01); *A23L 5/34* (2016.08); *B65D 85/808* (2013.01); *A23V 2002/00* (2013.01); *B65D 2581/344* (2013.01); *B65D 2581/3409* (2013.01); *B65D 2581/3472* (2013.01);

(Continued)

(58) Field of Classification Search
CPC ........ B65D 2581/3494; B65D 81/3453; B65D 2581/3479; B65D 81/3446; B65D 2581/3477; B65D 2581/3409; B65D 81/3461; B65D 2205/00; A23L 5/34
See application file for complete search history.

(56) References Cited

U.S. PATENT DOCUMENTS

| | | |
|---|---|---|
| 2,187,417 A | 1/1940 | Doble |
| 3,302,632 A | 2/1967 | Fichtner |
| 3,420,675 A | 1/1969 | Costas |

(Continued)

FOREIGN PATENT DOCUMENTS

| | | |
|---|---|---|
| CA | 1292934 C | 12/1991 |
| EP | 0397321 | 9/1996 |

(Continued)

OTHER PUBLICATIONS

Dictionary definition composition, https://www.dictionary.com/browse/composition, retrieved online Jun. 13, 2020 (Year: 2020).*

(Continued)

*Primary Examiner* — Hong T Yoo
(74) *Attorney, Agent, or Firm* — Fish & Richardson P.C.

(57) ABSTRACT

A beverage preparation package including a container defining a multiplicity of openings, and a beverage preparation composition positioned in the container. The beverage preparation composition includes a microwave susceptor and a beverage precursor. In some cases, the beverage preparation composition includes a particulate beverage precursor and a particulate microwave susceptor. The particulate beverage precursor typically includes a plant material, such as coffee beans, tea leaves, herbs, or the like. Preparing a beverage includes contacting water with a beverage preparation package including a beverage preparation composition and water, irradiating the water with microwave radiation to vaporize at least a portion of the water, thereby imparting a flavor from the beverage preparation composition to the water to yield the beverage. The beverage preparation composition can be separated from the beverage.

22 Claims, 2 Drawing Sheets

(51) Int. Cl.
*A23L 5/30* (2016.01)
*B65D 85/808* (2006.01)

(52) U.S. Cl.
CPC .............. *B65D 2581/3477* (2013.01); *B65D 2581/3478* (2013.01); *B65D 2581/3482* (2013.01)

(56) References Cited

U.S. PATENT DOCUMENTS

| | | | |
|---|---|---|---|
| 3,615,713 A | 10/1971 | Stevenson et al. | |
| 3,701,872 A | 10/1972 | Levinson | |
| 3,777,099 A | 12/1973 | Levinson | |
| 3,865,301 A | 2/1975 | Pothier et al. | |
| 3,936,626 A | 2/1976 | Moore | |
| 4,013,798 A | 3/1977 | Goltsos | |
| 4,190,757 A | 2/1980 | Turpin et al. | |
| 4,230,924 A | 10/1980 | Brastad et al. | |
| 4,267,420 A | 5/1981 | Brastad | |
| 4,268,738 A | 5/1981 | Flautt et al. | |
| 4,283,427 A | 8/1981 | Winters et al. | |
| 4,434,197 A | 2/1984 | Petriello et al. | |
| 4,676,857 A | 6/1987 | Scharr et al. | |
| 4,775,771 A | 10/1988 | Pawlowski et al. | |
| 4,865,921 A | 9/1989 | Hollenberg et al. | |
| 4,876,423 A | 10/1989 | Tighe et al. | |
| 4,943,456 A | 7/1990 | Pollart et al. | |
| 5,002,826 A | 3/1991 | Pollart et al. | |
| 5,079,396 A | 1/1992 | Katz et al. | |
| 5,118,747 A | 6/1992 | Pollart et al. | |
| 5,260,537 A | 11/1993 | Beckett | |
| 5,294,765 A | 3/1994 | Archibald et al. | |
| RE34,683 E | 8/1994 | Maynard et al. | |
| 5,545,879 A | 1/1996 | Brotz | |
| 5,864,123 A | 1/1999 | Keefer | |
| 6,414,290 B1 | 7/2002 | Cole et al. | |
| 6,436,457 B1 | 8/2002 | Poss | |
| 6,586,715 B2 | 7/2003 | Watkins | |
| 6,645,537 B2 | 11/2003 | Sweeney et al. | |
| 6,677,563 B2 | 1/2004 | Lai | |
| 6,903,320 B2 | 6/2005 | Cutler et al. | |
| 7,235,764 B2 | 6/2007 | Poss | |
| 8,158,913 B2 | 4/2012 | Zeng et al. | |
| 8,900,648 B2 | 12/2014 | Bunke et al. | |
| 10,106,422 B2 | 10/2018 | Shalev | |
| 2003/0080121 A1* | 5/2003 | Watkins | B65D 81/3453 219/759 |
| 2004/0067324 A1 | 8/2004 | Lazarev et al. | |
| 2017/0079325 A1* | 3/2017 | Mironov | A24B 13/00 |
| 2018/0206295 A1 | 7/2018 | Duffield et al. | |
| 2019/0075851 A1 | 3/2019 | Mironov | |

FOREIGN PATENT DOCUMENTS

| | | |
|---|---|---|
| ES | 2239335 T3 | 9/2005 |
| WO | WO2008143671 A1 | 11/2008 |
| WO | WO2012141864 A2 | 10/2012 |
| WO | WO2012163719 A1 | 12/2012 |
| WO | 2016032795 | 3/2016 |

OTHER PUBLICATIONS

Dictionary definition combine, https://www.dictionary.com/browse/combine, retrieved online Jun. 13, 2020 (Year: 2020).*

PCT International Search Report and Written Opinion in International Application No. PCT/US2019/068409, dated Mar. 12, 2020, 11 pages.

* cited by examiner

BEVERAGE PREPARATION COMPOSITION AND PACKAGE

TECHNICAL FIELD

This invention relates to a beverage preparation composition and package, as well as a method of preparing a beverage with the beverage preparation composition or package.

BACKGROUND

Beverages are often prepared by combining a flavored substance with water. When the flavored substance is soluble in water, beverage preparation consists of dissolving the flavored substance in water. When the flavored substance is insoluble in water (e.g., ground coffee beans or tea leaves), various methods can be used to impart flavor from the substance to the water. Although it is known to use microwave ovens to prepare hot beverages from flavored substances that are insoluble in water (e.g., ground coffee bean and tea leaves) such beverages often lack pleasing organoleptic properties. When imparting flavor from coffee grounds in the microwave, the beverage fails to become the typical opaque black/brown of brewed coffee.

SUMMARY

This disclosure relates to beverage preparation compositions, beverage preparation packages, and methods of preparing beverages with the beverage preparation compositions and packages.

In a first general aspect, a beverage preparation composition includes a particulate beverage precursor and a microwave susceptor. The microwave susceptor and the particulate beverage precursor are combined to form the beverage preparation composition.

Implementations of the first general aspect may include one or more of the following features.

The particulate beverage precursor is insoluble in water. The particulate beverage precursor includes plant-based material, such as coffee beans, tea leaves, herbs, fruit, or a portion or combination thereof. The beverage preparation composition can include a mixture of the particulate beverage precursor and the microwave susceptor in particulate form. The particulate beverage precursor, the microwave susceptor, or both, have a regular shape.

The microwave susceptor can include a magnetic, paramagnetic, or ferromagnetic material. In some cases, the microwave susceptor includes a metal (e.g., a metal oxide, such as an iron oxide, including ferrite, magnetite, hematite, or any combination thereof). Suitable metals include iron, aluminum, and stainless steel. In some cases, the microwave susceptor includes a ceramic. In certain cases, the microwave susceptor includes one or more of a carbonate, hydroxide, nitrate, silicate, and or sulfide.

The microwave susceptor typically has an electromagnetic radiation absorption coefficient of greater than about 60 m$^{-1}$ (1.5 in$^{-1}$) at standard ambient temperature and pressure at a microwave radiation frequency of 2,450 MHz. A weight ratio of the particulate beverage precursor to a particulate microwave susceptor is in a range of 1:1 to 1:40.

In a second general aspect, a beverage preparation package includes a container defining a multiplicity of openings and the beverage preparation composition of the first general aspect positioned in the container.

Implementations of the second general aspect can include one or more of the following features.

A shape of the openings is uniform, nonuniform, or a combination thereof. The container is a porous nonwoven material, woven material, or mesh.

In a third general aspect, preparing a beverage includes contacting water with the beverage preparation package including the beverage preparation composition of the first general aspect, and irradiating the water with microwave radiation to vaporize at least a portion of the water, thereby imparting a flavor from the beverage preparation composition to the water to yield the beverage.

The beverage, brewed coffee, or tea infusion has pleasing organoleptic properties which can vary in strength and flavor. Advantages of the beverage preparation compositions, beverage preparation packages, and resulting beverages result at least in part from water flow proximate to the beverage precursor during beverage preparation. This water flow is due at least in part to the temperature differential created by preferential heating of the microwave susceptor relative to the water, and at least in part to water vapor generated on the susceptor escaping upwards drawing fresh water in to replace the volume of water vapor lost. The direct thermal conductive contact between susceptor and beverage precursor and proximate water flow imparts noticeable flavor improvements over similar beverages prepared in the absence of a microwave susceptor, in which beverage precursors are subject to relatively even heating and little proximate fluid flow.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1A:
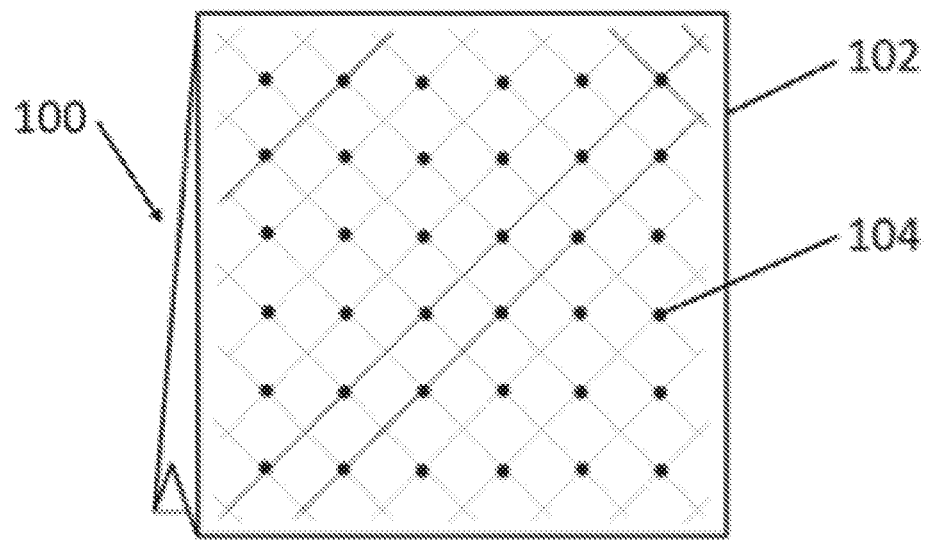
FIGS. 1A and 1B depict views of a beverage preparation package including a beverage preparation composition.

This disclosure describes beverage preparation compositions, beverage preparation packages, and methods of preparing beverages with beverage preparation compositions and packages. These beverage preparation compositions and packages can be used to prepare infused beverages from insoluble plant material, such as coffee beans, tea leaves, and herbs, with microwave radiation. In one example, the beverage preparation compositions and packages can be used to prepare brewed coffee and tea with a microwave oven to yield beverages with pleasing organoleptic properties.

A beverage preparation composition includes a beverage precursor and a microwave susceptor. The beverage precursor, the microwave susceptor, or both can be in particulate form. The beverage preparation composition is typically a mixture of the beverage precursor and the microwave susceptor.

The beverage precursor includes a plant-based material (e.g., a material originating from a plant or a product made from a plant) that is insoluble in water, such as coffee beans, tea leaves, herbs, fruit, other plant-based materials suitable for human ingestion, or any form or combination of these materials. The plant-based materials are referred to as being in "particulate" form, which includes whole, ground, cut, shredded, chopped, powdered, or any combination thereof. Particles of a particulate beverage precursor can be generally uniform in size (e.g., ground coffee) or include a various range of sizes (e.g., whole leaf tea and cut tea).

The microwave susceptor is a food grade material selected to absorb microwave radiation in the range of 300 MHz to 10,000 MHz, or from microwave ovens, which typically emit microwave radiation at a frequency of 915 MHz or 2,450 MHz. As such, the susceptor is heated by the microwave radiation. The microwave susceptor can be selected to have a microwave susceptibility at 2,450 MHz at standard ambient temperature and atmospheric pressure. The microwave susceptor typically exceeds the microwave susceptibility of the beverage precursor by at least a factor of 1.5, such that heat is transferred from the microwave susceptor by conduction, convection, or infrared radiation to the beverage precursor when the beverage preparation composition is irradiated with microwave radiation. In some cases, the microwave susceptor has an electromagnetic radiation absorption coefficient of greater than about 60 m$^{-1}$ (1.5 in$^{-1}$) at standard ambient temperature and pressure (25° C. and 100 kPa, 77° F. and 1 atm) for 2,450 MHz microwaves.

The microwave susceptor typically includes one or more metals or metal oxides. Suitable examples of metal oxides include hematite, magnetite, and ferrite. The microwave susceptor can include a magnetic, paramagnetic, or ferromagnetic material, or a combination of two or more of these materials. Suitable examples of metals include but are not limited to iron, aluminum, and stainless steel. In some cases, the microwave susceptor can include a ceramic, or be entirely composed of a ceramic. Also, the microwave susceptor can include a carbonate, hydroxide, nitrate, silicate, and or a sulfide (i.e., any form of rock or mineral that has microwave susceptibility in the previously described range). The susceptor material can be in the form of a particulate material, including regular shapes (e.g., spheres, cubes, or a combination thereof) and irregular shapes. Particles of the particulate material can be substantially uniform in size, with a largest dimension typically in a range of about 0.5 mm (0.02 in) to about 10.0 mm (0.4 in), but can be smaller or larger as appropriate.

A beverage preparation package includes a container defining a multiplicity of openings and a beverage preparation composition positioned in the container. The container is fabricated of material that does not readily reflect microwave radiation. In one example, the beverage preparation package can be disposed of after beverage preparation.

Figure 1B:
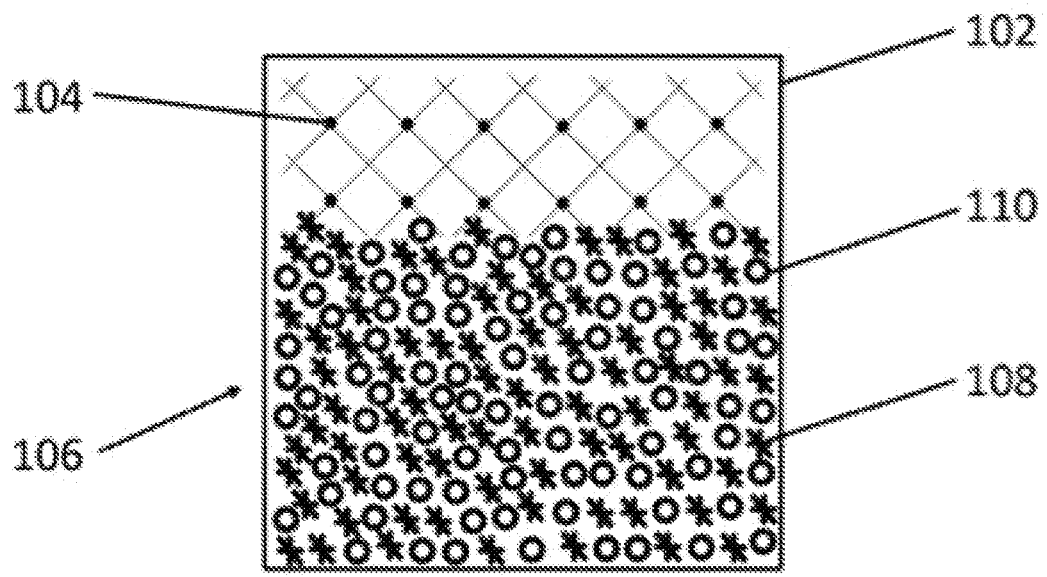

FIG. 1A depicts an example of beverage preparation package 100 with container 102. Container 102 may include a woven material, nonwoven material, solid material, or mesh formed of a natural material or synthetic material. Examples of suitable natural materials include but are not limited to cellulose, wood, and bamboo fiber. Examples of suitable synthetic materials include but are not limited to polylactic acid (biodegradable plastic commonly used in compost bags also known as compostable bioplastics), nylon, polypropylene, and polyethylene. Container 102 defines openings 104, including openings that are uniform or nonuniform in shape, size, or both. Openings that are nonuniform in shape can include pores in a fibrous porous material. The pores may be invisible to the unaided human eye. Openings that are uniform in shape can include openings (e.g., circular, semicircular, half-moon, ellipsoidal, or rectangular) that are formed by processes including punching, molding, and the like. Beverage preparation composition 106 is typically sealed in container 102. Openings 104 are sized such that water is able to pass through the container while the beverage preparation composition is retained within the container. FIG. 1B is a cross-sectional view of beverage preparation package 100 with beverage preparation composition 106 positioned in beverage preparation package 100. Beverage preparation composition 106 includes beverage precursor 108 and microwave susceptor 110 in particulate form.

Figure 2C:
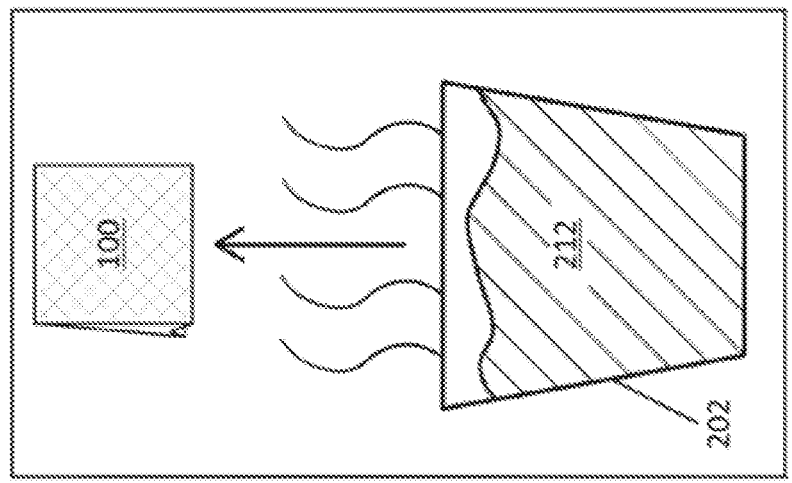
FIGS. 2A-2C depict operations in a process to prepare a beverage from a beverage preparation package.
Figure 2B:
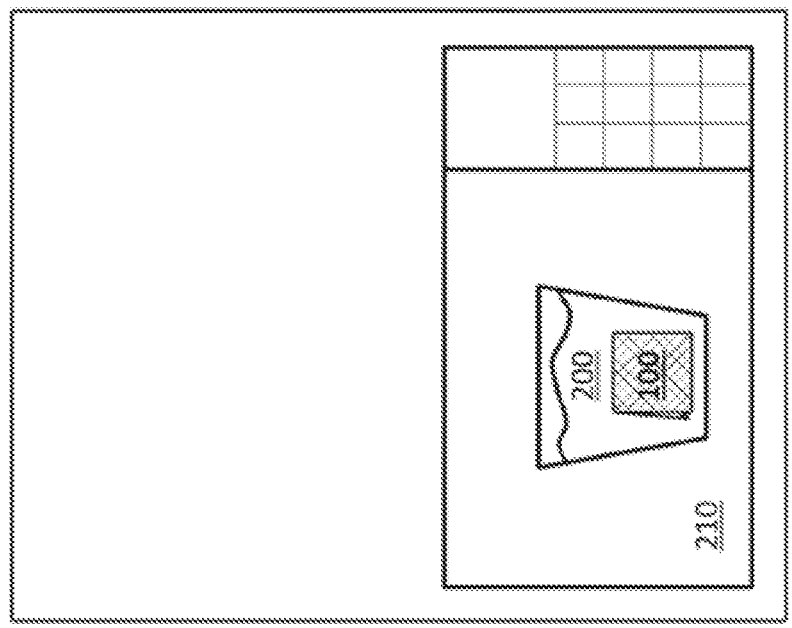
Figure 2A:
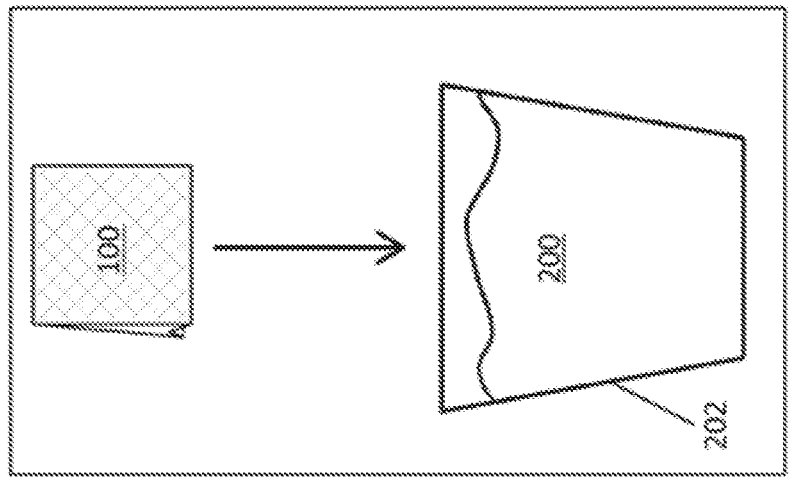

FIGS. 2A-2C depict operations in a process for preparing a beverage with beverage preparation composition or beverage preparation package. In FIG. 2A, a beverage preparation package 100 including a beverage preparation composition is contacted with water 200 in reservoir 202. Alternatively, beverage preparation package 100 can be placed in reservoir 202 and water 200 added to the reservoir. In FIG. 2B, water 200 and beverage preparation package 100 are irradiated with microwave radiation (e.g., in microwave oven 210) for approximately 1-3 minutes per 300 mL (10 US Fluid Ounces) of beverage, brewed coffee, or tea infusion to be prepared. In one example, the microwave radiation has a frequency of 2,450 MHz. The microwave radiation heats the microwave susceptor in the beverage preparation composition. The heated microwave susceptor transfers heat to water, thereby vaporizing a portion of the water, creating steam. Preferential heating of the beverage precursor occurs due to proximity to or contact with the fluid heated by the microwave susceptor circulated through, around, or about the beverage precursor. Heating of the beverage precursor occurs based, at least in part, on proximity to or direct contact with the microwave susceptor.

Flavor is imparted from the beverage precursor composition in the beverage preparation package 100 to water 200 to yield beverage 212 (e.g., brewed coffee or tea infusion). Beverage 212 is typically a hot beverage. Imparting the flavor occurs when vaporized water (steam), heated water, or both contact the beverage precursor. Imparting the flavor to the water may be understood as infusing the flavor in the water or brewing the beverage. The combination of heat and fluid flow allow the beverage to fully infuse or brew. In some cases, as depicted in FIG. 2C, beverage preparation package 100 is removed from reservoir 202 before beverage 212 is consumed.

The beverage, brewed coffee, or tea infusion has pleasing organoleptic properties and significant color change due at least in part to heating of the beverage precursor with the microwave susceptor.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination or in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A beverage preparation composition comprising:
a particulate beverage precursor; and
a particulate microwave susceptor,
wherein the particulate microwave susceptor and the particulate beverage precursor are combined to form the beverage preparation composition.

2. The beverage preparation composition of claim 1, wherein the particulate beverage precursor is insoluble in water.

3. The beverage preparation composition of claim 1, wherein the particulate beverage precursor comprises plant-based material.

4. The beverage preparation composition of claim 1, wherein the plant-based material comprises coffee beans, tea leaves, herbs, fruit, or a combination thereof.

5. The beverage preparation composition of claim 1, wherein the beverage preparation composition comprises a mixture of the particulate beverage precursor and the particulate microwave susceptor.

6. The beverage preparation composition of claim 1, wherein the particulate beverage precursor, the particulate microwave susceptor, or both, are spherical or cube-shaped.

7. The beverage preparation composition of claim 1, wherein the particulate microwave susceptor comprises a magnetic, paramagnetic, or ferromagnetic material.

8. The beverage preparation composition of claim 1, wherein the particulate microwave susceptor comprises a metal.

9. The beverage preparation composition of claim 1, wherein the particulate microwave susceptor comprises a metal oxide.

10. The beverage preparation composition of claim 9, wherein the metal oxide comprises an iron oxide.

11. The beverage preparation composition of claim 10, wherein the iron oxide comprises ferrite, magnetite, hematite, or any combination thereof.

12. The beverage preparation composition of claim 8, wherein the metal comprises iron, aluminum, or stainless steel.

13. The beverage preparation composition of claim 1, wherein the particulate microwave susceptor comprises a ceramic.

14. The beverage preparation composition of claim 1, wherein the particulate microwave susceptor comprises one or more of a carbonate, hydroxide, nitrate, silicate, or sulfide.

15. The beverage preparation composition of claim 1, wherein the particulate microwave susceptor has an electromagnetic radiation absorption coefficient of greater than about 60 m$^{-1}$ (1.5 in$^{-1}$) at standard ambient temperature and pressure at a microwave radiation frequency of 2,450 MHz.

16. The beverage preparation composition of claim 1, wherein a weight ratio of the particulate beverage precursor to the particulate microwave susceptor is in a range of 1:1 to 1:40.

17. A beverage preparation package comprising:
a container defining a multiplicity of openings; and
a beverage preparation composition positioned in the container, wherein the beverage preparation composition comprises a particulate beverage precursor and a particulate microwave susceptor, and the particulate microwave susceptor and the particulate beverage precursor are combined to form the beverage preparation composition.

18. The beverage preparation package of claim 17, wherein a shape of the openings is circular, semicircular, half-moon, ellipsoidal, rectangular, or a combination thereof.

19. The beverage preparation package of claim 17, wherein the container is a porous nonwoven material, woven material, or mesh.

20. A method of preparing a beverage, the method comprising:
contacting water with a beverage preparation package comprising a beverage preparation composition, wherein the beverage preparation composition comprises a particulate beverage precursor and a particulate microwave susceptor, wherein the particulate microwave susceptor and the particulate beverage precursor are combined to form the beverage preparation composition; and
irradiating the water with microwave radiation to vaporize at least a portion of the water, thereby imparting a flavor from the beverage preparation composition to the water to yield the beverage.

21. The beverage preparation package of claim 17, wherein the container comprises a porous material, and the openings comprise pores in the porous material.

22. The beverage preparation package of claim 17, wherein the particulate beverage precursor, the particulate microwave susceptor, or both, are spherical or cube-shaped.

* * * * *